(12) United States Patent
Bodain

(10) Patent No.: US 11,994,122 B2
(45) Date of Patent: May 28, 2024

(54) RECIPROCATING COMPRESSOR

(71) Applicant: ATLAS COPCO CREPELLE S.A.S., Lille (FR)

(72) Inventor: Bertrand Mathieu Bodain, Lille (FR)

(73) Assignee: ATLAS COPCO CREPELLE S.A.S., Lille (FR)

( * ) Notice: Subject to any disclaimer, the term of this patent is extended or adjusted under 35 U.S.C. 154(b) by 177 days.

(21) Appl. No.: 16/326,473

(22) PCT Filed: Nov. 14, 2017

(86) PCT No.: PCT/IB2017/057086
§ 371 (c)(1),
(2) Date: Feb. 19, 2019

(87) PCT Pub. No.: WO2018/092017
PCT Pub. Date: May 24, 2018

(65) Prior Publication Data
US 2021/0140420 A1 May 13, 2021

(30) Foreign Application Priority Data
Nov. 16, 2016 (FR) ........................................ 1661102
Feb. 22, 2017 (BE) .................................... 2017/5110

(51) Int. Cl.
*F04B 39/10* (2006.01)
*F04B 39/00* (2006.01)
(Continued)

(52) U.S. Cl.
CPC .......... *F04B 39/10* (2013.01); *F04B 39/0066* (2013.01); *F04B 39/123* (2013.01); *F16K 47/00* (2013.01); *F04B 53/10* (2013.01)

(58) Field of Classification Search
CPC .... F04B 39/10; F04B 39/0066; F04B 39/123; F04B 53/10; F16K 47/00
(Continued)

(56) References Cited

U.S. PATENT DOCUMENTS 2,318,128 A * 5/1943 Tabb ...................... F04B 43/02
  92/94
3,109,584 A * 11/1963 Gerteis ................. F04B 39/005
  417/312
(Continued)

FOREIGN PATENT DOCUMENTS

CA 2644346 A1 5/2010
EP 1059444 A2 12/2000
(Continued)

OTHER PUBLICATIONS

International Search Report in related PCT Application No. PCT/IB2017/057086, dated Jan. 22, 2018.
(Continued)

*Primary Examiner* — Christopher S Bobish
(74) *Attorney, Agent, or Firm* — BACON & THOMAS, PLLC

(57) ABSTRACT

A reciprocating compressor comprising a cylinder and a piston dividing the cavity in the cylinder into a first and a second chamber being connected through respective suction valve systems and discharge valve systems to a suction duct and a discharge duct. The suction and discharge valve systems each including a housing defining a valve chamber and a valve body, whereby the compressor is further provided with a vessel defining a volume in fluid connection with a valve chamber of one of the discharge valve systems by a conduit.

9 Claims, 2 Drawing Sheets

(51) Int. Cl.
*F04B 39/12* (2006.01)
*F04B 53/10* (2006.01)
*F16K 47/00* (2006.01)

(58) Field of Classification Search
USPC .................................................. 417/540, 542
See application file for complete search history.

(56) References Cited

U.S. PATENT DOCUMENTS

| | | | | |
|---|---|---|---|---|
| 3,143,969 A | * | 8/1964 | Sanford | F04B 53/123 417/44.9 |
| 3,192,864 A | * | 7/1965 | Notte | F02M 1/00 417/540 |
| 3,584,981 A | * | 6/1971 | Worster | F04B 39/10 417/542 |
| 4,128,109 A | | 12/1978 | Chervenak et al. | |
| 4,264,287 A | * | 4/1981 | Ishida | F02M 37/0041 138/30 |
| 4,274,434 A | * | 6/1981 | Hafele | F16K 17/28 137/498 |
| 4,373,872 A | * | 2/1983 | Kemmner | F02M 37/0041 138/30 |
| 4,646,782 A | * | 3/1987 | Ezekoye | F16K 47/02 417/540 |
| 4,928,733 A | | 5/1990 | Sudolnik et al. | |
| 5,094,599 A | * | 3/1992 | Budecker | B60T 8/4031 303/87 |
| 5,096,400 A | * | 3/1992 | Budecker | B60T 8/4068 417/540 |
| 5,209,553 A | * | 5/1993 | Burgdorf | B60T 8/341 303/116.1 |
| 5,257,606 A | * | 11/1993 | Willman | F02M 37/0041 123/447 |
| 5,832,898 A | * | 11/1998 | Wakeman | F02M 51/02 123/447 |
| 5,967,623 A | * | 10/1999 | Agnew | B60T 8/368 138/26 |
| 6,077,049 A | | 6/2000 | Nakamura et al. | |
| 6,095,774 A | * | 8/2000 | Tanaka | F02M 55/04 417/540 |
| 6,176,692 B1 | * | 1/2001 | Reinartz | B60T 8/4031 417/454 |
| 7,610,902 B2 | * | 11/2009 | Beardmore | F02M 59/44 123/467 |
| 8,162,635 B2 | * | 4/2012 | Mizuno | F04B 43/02 417/540 |
| 8,591,208 B2 | * | 11/2013 | Broerman, III | F04B 53/004 181/403 |
| 10,227,975 B2 | * | 3/2019 | Lilie | F04B 39/125 |
| 2010/0172771 A1 | * | 7/2010 | Hoffarth | F04B 9/1095 417/393 |
| 2010/0329899 A1 | | 12/2010 | Broerman, III et al. | |

FOREIGN PATENT DOCUMENTS

| | | |
|---|---|---|
| EP | 1659302 A1 | 5/2006 |
| EP | 2370717 B1 | 6/2013 |
| JP | H0643436 U | 6/1994 |
| JP | H10103228 A | 4/1998 |
| WO | 2013098097 A1 | 7/2013 |

OTHER PUBLICATIONS

Written Opinion in related PCT Application No. PCT/IB2017/057086, dated Jan. 22, 2018.

* cited by examiner

RECIPROCATING COMPRESSOR

The present invention relates to a reciprocating compressor comprising a cylinder with a cavity therein and a reciprocating moveable arrangement comprising a piston and a piston rod and driving means configured to move said arrangement into reciprocating motion, said piston dividing said cavity into a first and a second chamber, respectively called head end chamber and crank end chamber, each of said first and second chambers being connected through respective suction valve systems and discharge valve systems to a suction duct and a discharge duct, said suction and discharge valve systems each comprising a housing defining a valve chamber and a valve body moveable between a first, closed position in which said first or second chamber is fluidly disconnected from said valve chamber, and a second, open position in which said first or second chamber is in fluid communication with a respective valve chamber.

BACKGROUND OF THE INVENTION

A known type of reciprocating compressor is shown in EP 1.659.302 A1.

During operation of a reciprocating compressor, said piston will be moved back and forth in the cylinder, thereby alternately sucking in a gas to be compressed through the suction valve systems and, at the same time compress an amount of gas on the other side of the piston and forcing compressed gas through on of the discharge valve systems into the discharge duct.

Practice has shown that, during the operation of a reciprocating compressor, high pulsation levels occur in the discharge valve systems which can result in severe damages to these discharge valve systems.

Known measures to try and solve this issue consists in increasing the volume of the valve chambers or in adding a big external volume, however, typically there are restrictions in terms of available build-in space as the overall dimensions of the compressor is often fixed.

SUMMARY OF THE INVENTION

The current invention relates to a reciprocating compressor that does not show such high pressure pulse variations and that not requires an up-scaling of the machine size, and further provides a cost efficient approach to reach the above goals.

To this aim, the invention relates to a reciprocating compressor comprising a cylinder with a cavity therein and a reciprocating moveable arrangement comprising a piston and a piston rod and driving means configured to move said arrangement into reciprocating motion, said piston dividing said cavity into a first and a second chamber, respectively called head end chamber and crank end chamber, each of said first and second chambers being connected through respective suction valve systems and discharge valve systems to a suction duct and a discharge duct, said suction and discharge valve systems each comprising a housing defining a valve chamber and a valve body moveable between a first, closed position in which said first or second chamber is fluidly disconnected from said valve chamber, and a second, open position in which said first or second chamber is in fluid communication with a respective valve chamber, whereby said compressor is further provided with a vessel defining a volume, said volume being in fluid connection with a valve chamber of at least one of said discharge valve systems by means of a conduit.

An advantage of the invention is that the additional space is created to serve as a buffer for pressure pulsations and the small volume in the conduit acts like a spring in opposite phase with pulsations in the valve chamber, resulting in that the pressure peaks in the valve chamber of the concerned discharge valve system are decreased and damage on the discharge valve system can be avoided, without there being a need of increasing the over-all dimensions of the machine.

Additionally it was found that in the set-up according to the present invention, said connection between said valve chamber and said volume in the vessel will operate as a Helmholtz acoustic filter or low pass filter resulting in the desired pulsation reduction and an increase of the lifespan of the discharge valve system.

Indeed, since the set-up acts as a filter, frequencies in the system which are above the cut-off frequency of the filter are suppressed and thus as a consequence, pulsations are reduced.

Preferably said vessel comprises a sealed housing so as to restrict any leakages of high pressure gas into the atmosphere.

According to another preferential characteristic of the invention the sealed housing of said vessel is connected to a respective valve housing.

Said conduit connecting the discharge valve chamber to said volume in said vessel is preferably made in the shape of a straight tube extending with one end in said discharge valve chamber and with the other end in said vessel.

BRIEF DESCRIPTION OF THE DRAWINGS

With the intention of better showing the characteristics of the invention, hereafter some preferred embodiments of a reciprocating compressor according to the invention are described, by way of illustration, without any limiting nature, wherein.

DETAILED DESCRIPTION OF THE INVENTION

Figure 1:
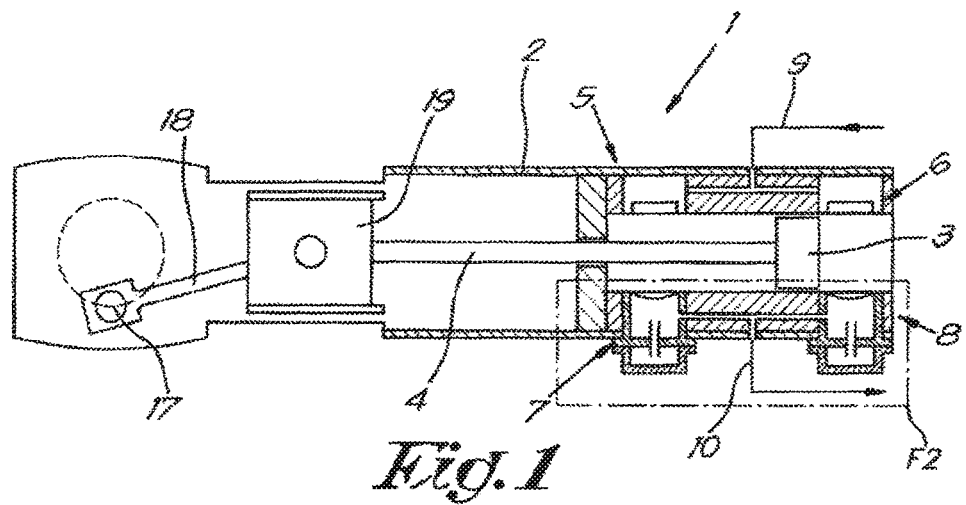
FIG. 1 schematically represents a reciprocating compressor according to the invention.
Figure 2:
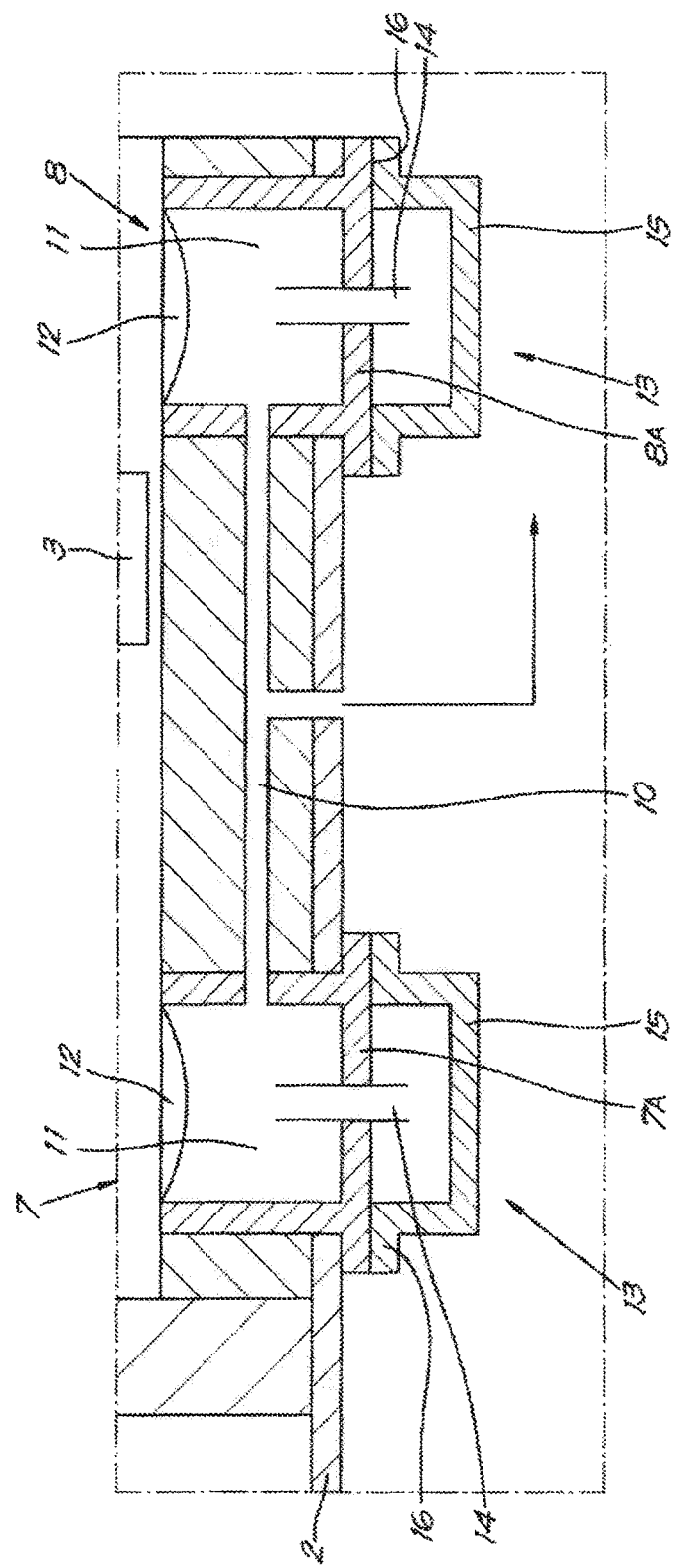
FIG. 2 represents the part indicated with F2 in FIG. 1 on a larger scale.

FIGS. 1 and 2 show a reciprocating compressor 1 according to the invention. Said compressor 1 comprises a cylinder 2 with an inner cylinder cavity housing a piston 3. Said piston 3, which is moveable inside said cavity, makes part of a reciprocating moveable arrangement further comprising a piston rod 4.

The compressor 1 further comprises driving means configured to move said arrangement into reciprocating motion, said driving means possibly comprising a crankshaft.

Said piston 3 divides said cavity into a first and a second chamber, respectively called head end chamber and crank end chamber, each of said first and second chambers being connected through a respective suction valve system or 6 and a discharge valve system 7 or 8 to a respective suction duct 9 and discharge duct 10.

Said suction valve systems 5 and 6 and said discharge valve systems 7 and 8 each comprise a valve housing defining a valve chamber 11 wherein a valve body 12 is moveably arranged. The valve body 12 in each valve chamber 11 is configured to move between a first, closed position in which said first or second chamber is fluidly disconnected from the associated valve chamber 11, and a second, open position in which said first or second chamber is in fluid communication with a respective valve chamber 11. In the embodiment as depicted in FIG. 2, said discharge valve systems 7 and 8 further comprise a valve cover 7A and 8A, respectively. Each of said valve covers 7A and 8A in this case comprises a mainly tubular section extending along the longitudinal walls of the valve chambers 11. Said valve covers 7A and 8A are configured so as to maintain the valve bodies 12 in the correct orientation within the discharge valve system 7 or 8.

According to the invention, the reciprocating compressor 1 is further provided with at a vessel 13, and in this particular case with two vessels 13, each defining a volume, said volume being in fluid connection with a valve chamber 11 of at least one respective discharge valve system 7 and 8, respectively, by means of a conduit 14.

According to a preferred characteristic of the invention, said vessel 13 comprises a sealed housing 15 so as to restrict any leakages of high pressure gas into the atmosphere. In this case, but not necessarily, each of said vessel housings 15 is mounted on a respective valve housing of the discharge valve systems 7 and 8.

The vessel housings 15 each comprise a mainly cylindrical receptacle closed off at one end with a bottom wall and being mounted with its open end against the cylinder outer wall, either directly or indirectly.

In the example as shown in FIG. 2, the respective valve covers 7A and 8A are closed off at their outer ends with an end wall through which a respective conduit 14 extends and said vessel housing 15 is connected onto an outwardly directed flange on said outer end of said valve cover 7A or 8A. However, alternatively, the valve chambers 11 could be delimited by the wall of the cylinder 2 instead, said conduits 14 extending through said wall and said vessel housings 15 for example being connected to said cylinder wall as well.

It is clear that, according to the invention, many ways of interconnecting the vessel housing 15 to said valve housing are possible and the invention is not limited to the exact configuration as shown in FIG. 2.

The connecting means for establishing the connection between the vessel 13 and the valve housing can be of different kinds such as a bolt connection, a welded connection or any other type of mechanical connection. In this case both said vessel housing 15 and said valve housing are provided with a sealing surface. The sealing surface of the vessels 13 is in this case formed by the end face of a connection flange 16.

Between said flange 16 and said valve housing 15 is preferably provided a seal, in this case in the shape of an O-ring, however, it is clear that all kinds of seals can be used.

The conduits 14 connecting each of the discharge valve chambers 11 to a respective volume in a vessel 13 are preferably made in the shape of a straight tube extending with one end in said discharge valve chamber 11 and with the other end in said vessel 13.

The reciprocating movement of the piston 3 and of the piston rod 4 is, in this example, controlled by a crankshaft 17 through a connecting rod 18 that is hinged to a crosshead 19, preferably provided with sliding shoes in sliding contact with sliding surfaces. The rotational motion of the crankshaft 17 is converted into reciprocating linear motion of the crosshead 19 and this movement is transmitted to said piston 3. Alternatively, a reciprocating compressor 1 according to the invention can be made in the shape of a so-called wobble piston in which the crankshaft 17 typically directly drives the piston rod 4, without intermediate connecting rod or sliding shoes.

The working principle of a reciprocating compressor 1 according to the invention as shown in FIGS. 1 and 2 is the same as that of known reciprocating compressors of the double-working type, whereby gas will be sucked in through one of the suction valve systems 5 or 6 upon linear motion of the piston 3 in the cylinder 2. In case the piston 3 is moved such that the volume in the head end chamber decreases, gas to be compressed is sucked through suction duct 9 and suction valve system 5 into the crank end chamber. Near the end of its stroke, the piston 3 pushes compressed gas out of the head end chamber through the discharge valve system 8. Similarly, while performing a movement in the opposite direction, gas will be sucked into the head end chamber through suction duct 9 and pushed out of the crank end chamber through discharge valve system 7.

The main advantage of the invention is that the additional space that is created by addition of the vessel 13, serves as a buffer for pressure pulsations, resulting in that the pressure peaks in the valve chambers 11 of the respective discharge valve system 7 and 8 are decreased and damage on the discharge valve systems 7 and 8 can be avoided, without there being a need of increasing the over-all dimensions of the machine.

Indeed, the whole consisting of the valve chamber 11, the associated conduit 14 and volume in the vessel 13 operates as a Helmholtz acoustic filter or low pass filter resulting in pulsation reduction and eventually in an increase of the lifespan of the discharge valve system as frequencies in the system which are above the cut-off frequency of the filter are suppressed and thus, as a consequence, pulsations are reduced.

Since the main flow of compressed gas leaving the discharge valve chamber 11 does not flow through the vessel 13, there is limited pressure drop according as opposed to systems in which the compressed gas is pushed through a number of successive chambers in order to try and limit pulsations. Indeed, the discharge valve chambers 11 are fluidly connected to the discharge duct 10 in order to evacuate the main compressed gas stream therefrom, however, additionally, the conduits 14 extend into these discharge valve chambers 11 in order to only allow a minor secondary portion of compressed gas to be moved into the associated vessel 13, such that the volume in said vessel 13 acts as an attenuator for pulsations occurring in the discharge valve chamber 11.

Figure 3:
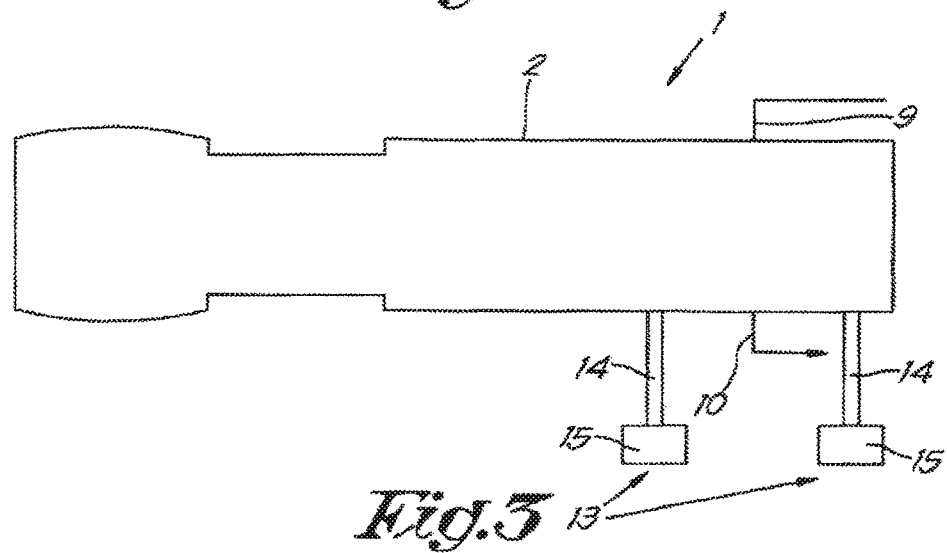
FIGS. 3 and 4 represent alternative embodiments of a reciprocating compressor according to the invention.

According to an alternative embodiment of a reciprocating compressor 1 according to the invention, as can be seen in FIG. 3, the at least on vessel housing 15 is not directly connected to the cylinder wall, but instead is mounted at a distance from said cylinder 2.

In the embodiments shown in FIGS. 1 to 3, said cylinder 2 shows two discharge valve systems 7 and 8, the valve chamber 11 of each of said discharge valve systems 7 and being connected to an above-mentioned vessel 13, however, the invention is not limited as such, since a reciprocating compressor 1 according to the invention can also contain only one discharge valve system 13, as would be the case if the piston was single-working rather than double-working. Alternatively, the reciprocating compressor 1 according to the invention may also comprise even more than two discharge valve system 13.

Preferably, but not necessarily both discharge valve system 13 are positioned on the same side of said cylinder 2.

Figure 4:
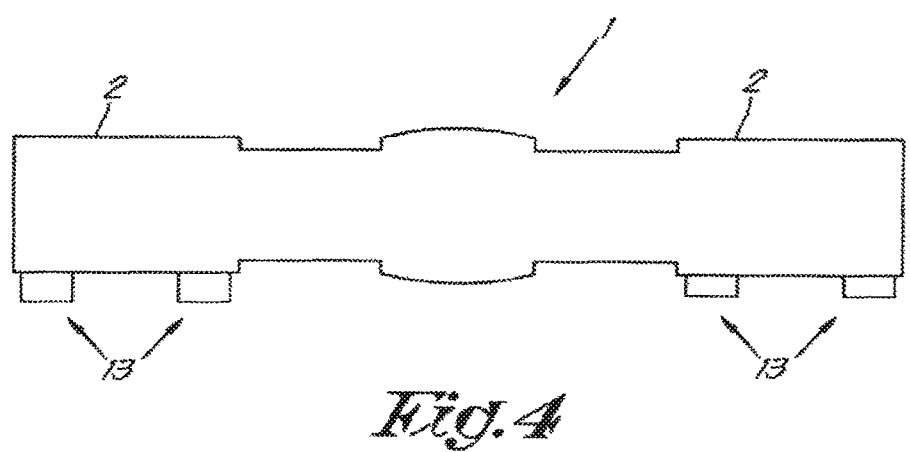

Turning to FIG. 4, an embodiment of reciprocating compressor 1 is shown that comprises two piston rods 4, each piston rod 4 being connected to a respective piston 3 and to said driving means.

The present invention is in no way limited to the forms of embodiment described above and represented in the drawings, however, a reciprocating compressor according to the invention can be made in all shapes and dimensions, without departure from the scope of the invention.

The invention claimed is:

1. A reciprocating compressor comprising:
a cylinder with a cavity therein; and
a reciprocating moveable arrangement comprising a piston and a piston rod and driving means configured to move said arrangement into reciprocating motion,
said piston dividing said cavity into a first and a second chamber,
each of said first and second chambers being connected through a respective at least one suction valve system and at least one discharge valve system to a suction duct and a discharge duct,
said at least one suction valve system and said at least one discharge valve system each comprising a respective housing defining a valve chamber and a valve body, the valve chamber having a first side in direct fluid communication with one of said first and second chamber and a second side and the valve body being moveable between a first, closed position in which the one of said first or second chambers is fluidly disconnected from said valve chamber, and a second, open position in which said first or second chamber is in fluid communication with said respective valve chamber,
wherein the second side of said valve chamber of said at least one discharge valve system is directly connected to the discharge duct,
wherein said compressor is further provided with a vessel, the vessel comprising a housing formed as a mainly cylindrical receptacle closed off at one end with a bottom wall, the vessel having a fixed and defined volume, said volume being in direct and continuous fluid connection with the valve chamber of said at least one discharge valve system by a conduit in a way such that compressed fluid does not flow through the vessel to the discharge duct;
wherein said conduit connecting the discharge valve chamber to said volume in said vessel is made in the shape of a straight tube extending with one end in said discharge valve chamber and with the other end inside said vessel.

2. The reciprocating compressor according to claim 1, wherein said vessel comprises a sealed housing so as to restrict any leakages of high pressure gas into the atmosphere.

3. The reciprocating compressor according to claim 1, wherein said vessel comprises a housing and said vessel housing is mounted on a respective valve housing.

4. The reciprocating compressor according to claim 3, wherein sealing means are provided between a sealing surface of said vessel and a sealing surface of said valve housing upon which said vessel is mounted.

5. The reciprocating compressor according to claim 1, wherein said cylinder further comprises a second discharge valve system, wherein a second valve chamber of said second discharge valve system being connected to a second vessel.

6. The reciprocating compressor according to claim 5, wherein both discharge valve systems are positioned on the same side of said cylinder.

7. The reciprocating compressor according to claim 1, wherein said compressor further comprises at least one second piston rod, said at least one second piston rod being connected to a second piston and to said driving means.

8. The reciprocating compressor according to claim 5, wherein said compressor further comprises at least one second piston rod, said at least one second piston rod being connected to a second piston and to said driving means.

9. A reciprocating compressor comprising:
a cylinder with a cavity therein; and
a reciprocating moveable arrangement comprising a piston and a piston rod and driving means configured to move said arrangement into reciprocating motion,
said piston dividing said cavity into a first and a second chamber,
each of said first and second chambers being connected through a respective at least one suction valve system and at least one discharge valve system to a suction duct and a discharge duct,
said at least one suction valve system and said at least one discharge valve system each comprising a respective housing defining a valve chamber and a valve body, the valve chamber having a first side in direct fluid communication with one of said first and second chamber and a second side and the valve body being moveable between a first, closed position in which the one of said first or second chambers is fluidly disconnected from said valve chamber, and a second, open position in which said first or second chamber is in fluid communication with said respective valve chamber,
wherein the second side of said valve chamber of said at least one discharge valve system is directly connected to the discharge duct,
wherein said compressor is further provided with a vessel, the vessel comprising a housing formed as a mainly cylindrical receptacle closed off at one end with a bottom wall, the vessel having a fixed and defined volume, said volume being in direct and continuous fluid connection with the second side of the valve chamber of said at least one discharge valve system by a conduit in a way such that compressed fluid does not flow through the vessel to the discharge duct;
wherein said conduit is a straight tube extending with one end in said discharge valve chamber and with the other end in said vessel, and
wherein the valve chamber of said at least one discharge valve system, the conduit, and the volume are configured to operate as a low pass filter.

* * * * *